United States Patent
Tsou

(10) Patent No.: US 11,238,299 B2
(45) Date of Patent: Feb. 1, 2022

(54) IMAGE ANALYZING DEVICE AND METHOD FOR INSTRUMENTATION, INSTRUMENTATION IMAGE ANALYZING SYSTEM, AND NON-TRANSITORY COMPUTER READABLE RECORD MEDIUM

(71) Applicant: UTECHZONE CO., LTD., New Taipei (TW)

(72) Inventor: Chia-Chun Tsou, New Taipei (TW)

(73) Assignee: UTECHZONE CO., LTD., New Taipei (TW)

( * ) Notice: Subject to any disclaimer, the term of this patent is extended or adjusted under 35 U.S.C. 154(b) by 497 days.

(21) Appl. No.: 15/867,196

(22) Filed: Jan. 10, 2018

(65) Prior Publication Data

US 2018/0204081 A1 Jul. 19, 2018

(30) Foreign Application Priority Data

Jan. 19, 2017 (TW) .................................. 106101878

(51) Int. Cl.
*G06K 9/32* (2006.01)
*H04N 5/232* (2006.01)
*G06T 7/11* (2017.01)
*H04N 7/18* (2006.01)

(52) U.S. Cl.
CPC .............. *G06K 9/3241* (2013.01); *G06T 7/11* (2017.01); *H04N 5/232* (2013.01); *H04N 5/23222* (2013.01); *H04N 7/18* (2013.01)

(58) Field of Classification Search
CPC ........ G06K 9/3241; G06T 7/11; H04N 5/232; H04N 5/23222; H04N 7/18
See application file for complete search history.

(56) References Cited

U.S. PATENT DOCUMENTS

| | | | |
|---|---|---|---|
| 2004/0169673 A1* | 9/2004 | Crampe | A61B 34/20 715/700 |
| 2008/0114238 A1* | 5/2008 | Lloyd | A61B 6/4405 600/436 |
| 2010/0134605 A1* | 6/2010 | Demos | A61B 5/0071 348/65 |
| 2011/0301447 A1* | 12/2011 | Park | G06T 7/0016 600/407 |
| 2012/0184846 A1* | 7/2012 | Izatt | A61B 3/132 600/425 |
| 2013/0038707 A1* | 2/2013 | Cunningham | A61B 1/0005 348/65 |

(Continued)

*Primary Examiner* — Mia M Thomas
(74) *Attorney, Agent, or Firm* — Muncy, Geissler, Olds & Lowe, P.C.

(57) ABSTRACT

An instrumentation image analyzing system includes an image capturing device, a processor connected to the image capturing device, and a communication module connected to the processor, which replaces visual observation work of human by image analyzing technique for saving costs of manual visual observation as well as reducing the error rate of detection and enhancing the efficiency of detection. The image capturing device captures an image of at least one instrumentation to obtain an instrumentation image. The processor loads a program to perform an instrumentation identifying module which identifies the instrumentation image to generate an instrumentation information. The communication module transmits the instrumentation information to an external device.

18 Claims, 11 Drawing Sheets

(56) References Cited

U.S. PATENT DOCUMENTS

| | | | | |
|---|---|---|---|---|
| 2014/0272866 | A1* | 9/2014 | Kim | G09B 9/00 |
| | | | | 434/262 |
| 2015/0230875 | A1* | 8/2015 | Shademan | A61B 5/0036 |
| | | | | 600/407 |
| 2016/0034764 | A1* | 2/2016 | Connor | G06K 9/00771 |
| | | | | 348/158 |
| 2016/0117823 | A1* | 4/2016 | Isaacs | G06T 3/20 |
| | | | | 715/863 |
| 2016/0162639 | A1* | 6/2016 | Parbery | G16H 10/60 |
| | | | | 705/3 |
| 2017/0110027 | A1* | 4/2017 | Knight | G09B 5/02 |
| 2018/0357514 | A1* | 12/2018 | Zisimopoulos | G06N 3/0472 |
| 2019/0362834 | A1* | 11/2019 | Venkataraman | G06N 20/00 |

* cited by examiner

IMAGE ANALYZING DEVICE AND METHOD FOR INSTRUMENTATION, INSTRUMENTATION IMAGE ANALYZING SYSTEM, AND NON-TRANSITORY COMPUTER READABLE RECORD MEDIUM

BACKGROUND OF THE INVENTION

1. Field of the Invention

The present invention relates to an image analyzing device for instrumentation, system and method; more particularly to an image analyzing device for instrumentation, system and method, which are able to read data of instrumentation images automatically through image analyzing.

2. Description of the Prior Art

The measuring instrumentations for industrial applications generally use to measure and collect industrial data which is related to producing activities so as to be used as a reference for control and decision management in a factory, such as manufacturing monitoring (for example, temperatures, pressures, flows, liquid-levels, and composition concentrations), industrial safety and environmental protection monitoring (for example, wastewater, waste gas, and noise), public system monitoring (for example, water usage, electric usage, air conditioner temperature), etc.

In order to reduce amount of manpower for time consuming work such as reading, transforming, and calculating an instrumentation data, it generally uses an industrial instrumentation with data outputting functions and executes information communication techniques to achieve a purpose of digital management. However, for practicing digital management, it should build Local Area Network to connect a plurality of measuring instrumentations for the purpose of backstage control. Furthermore, a part of traditional or analog instrumentations do not have data outputting functions, so that those data must be monitored by manual visual observation.

SUMMARY OF THE INVENTION

The main object of the present invention is to solve the problem that in the conventional technology, the instrumentations should be monitored and recorded by human work and various instrumentations are not easily to execute real-time monitoring in special sites.

The present invention provides an image analyzing device for instrumentation, comprising: an image capturing module, a processor connected to the image capturing device and a communication module coupled to the processor. The image capturing module captures an instrumentation image of at least one instrumentation. The processor performs an instrumentation identify module which identifies the instrumentation image and generates an instrumentation information. The communication module coupled to the processor transmits the instrumentation information of the instrumentation to an external device.

Another object of the present invention is to provide an instrumentation image analyzing system having the above mentioned device, comprising: a remote server for receiving the instrumentation information and analyzing the instrumentation information of the instrumentation to generate an instrumentation information evaluation result.

Still another object of the invention is to provide an image analyzing method for instrumentation, comprising: capturing an instrumentation image of at least one instrumentation through an image capturing module; identifying the instrumentation image to generate an instrumentation information of the instrumentation; and transmitting the instrumentation information to an external device after generating the instrumentation information.

Another object of the present invention is to provide a non-transitory computer readable record medium, comprising a set of instructions for being executed on a computer and causing the computer to implement the above mentioned method to perform the image analyzing method for instrumentation.

DETAILED DESCRIPTION OF THE EMBODIMENT OF THE INVENTION

Descriptions and techniques of the present invention would be illustrated in detail with reference to the accompanying drawings herein. Furthermore, for easier illustrating, the drawings of the present invention are not a certainly the practical proportion and are not limited to the scope of the present invention.

Figure 1:
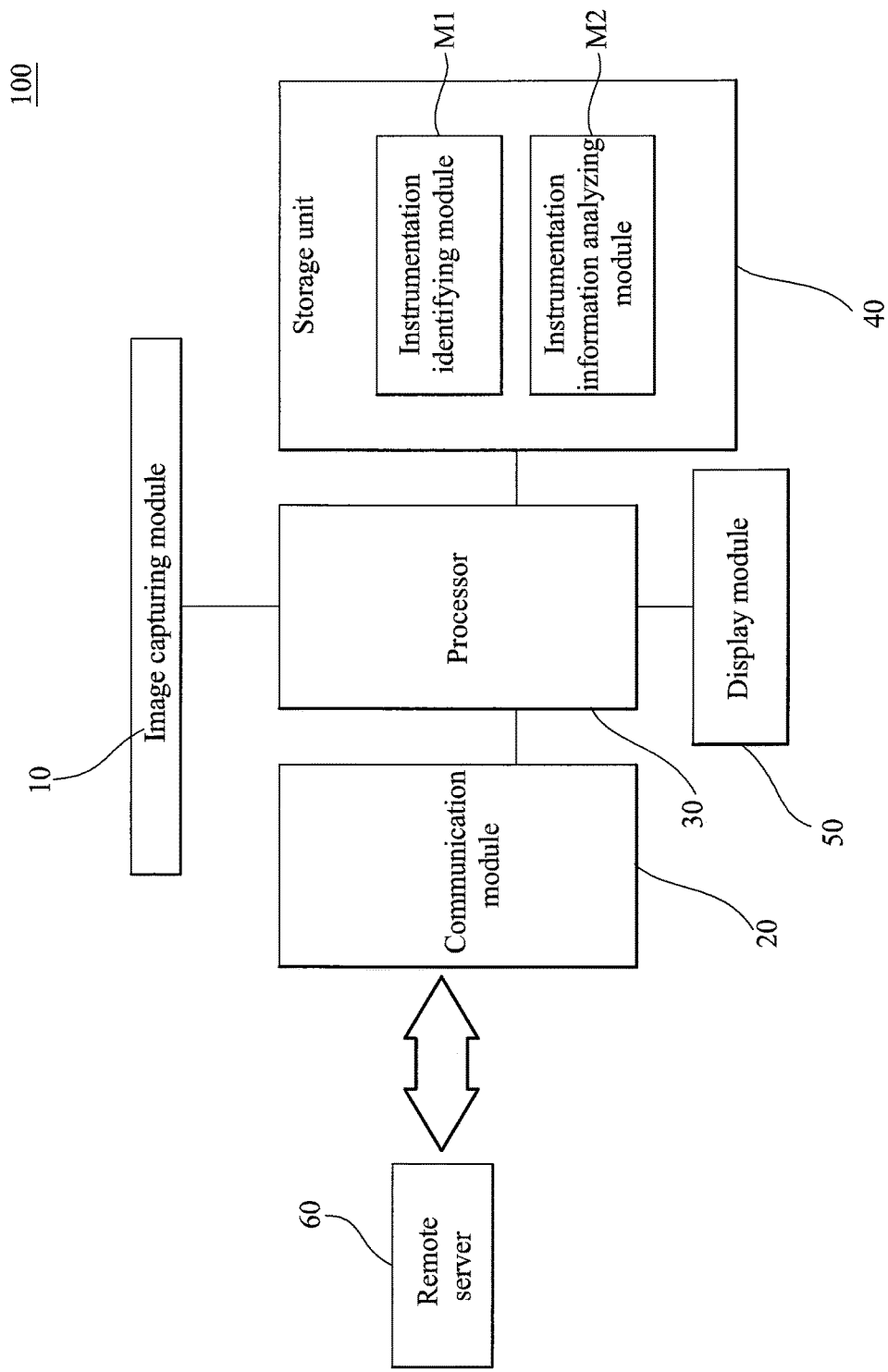
FIG. 1 shows a block schematic diagram of the instrumentation image analyzing system of the present invention.

Referring to FIG. 1, which shows the block schematic diagram of the instrumentation image analyzing system of the preset invention.

The present invention provides an instrumentation image analyzing system 100, which replaces visual observation work of human by image analyzing technique for saving costs of manual visual observation as well as reducing the error rate of detection and enhancing the efficiency of detection.

The instrumentation image analyzing system 100 mainly comprises an image capturing module 10, a communication module 20, a processor 30 connected to the image capturing module 10 and the communication module 20 coupled to the processor 30, and a remote server 60 for managing the instrumentation information.

The image capturing module 10 is for capturing an instrumentation image of at least one instrumentation. Specifically, the image capturing module 10 is a camera equipped with Charge Coupled Device (CCD) or Complementary Metal-Oxide Semiconductor (CMOS), and the present invention is not limited thereto.

The communication module 20 is for connecting to an external device, such as a remote server, a computer, a mobile device, or other similar equipment, and the present invention is not limited thereto. Specifically, the communication module 20 enables the processor 30 to be communicated with other equipment or devices via wire or wireless means. The wire means may be, for example, a physical transmitting interface for transmitting signals, such as electrical signals and light signals, to transmit instrumentation images captured by the image capturing module 10 or instrumentation information generated by analyzing the instrumentation image by the processor 30 to an external device through the established physical wiring line. Specifically, the wireless way is one or combination of two or above of Bluetooth, Infrared (IR), Near Field Communication (NFC), Wireless Local Area Network (WLAN), Wireless Gigabit Alliance (WiGig), ZigBee, Wireless USB, Ultra-Wide Band (UWB), or Wi-Fi. The scope of the present invention is not limited to the foregoing communication protocols and ciphering ways.

The processor 30 is for performing an instrumentation identifying module which identifies the instrumentation image and generates an instrumentation information. The foregoing instrumentation information comprises an instrumentation category information, an instrumentation data, and/or an instrumentation indication information of the at least one instrumentation. Specifically, the processor 30 performs an image analyzing process to the instrumentation image obtained by image capturing module 10 for obtaining the instrumentation information from the instrumentation image. Specifically, the processor 30 is coupled with a storage unit 40, which is used to storage data, to access a program or data in the storage unit 40 to execute the corresponding procedure. The processor 30 is a central processing unit (CPU) or other programmable processor with normal or specific purposes, such as microprocessor, digital signal processor (DSP), programmable controller, application specific integrated circuits (ASIC), programmable logic device (PLD), and other similar devices or combinations thereof.

The storage unit 40 is any type of fixed or movable unit such as random access memory (RAM), Read-only Memory (ROM), Flash Memory and other similar units or combinations thereof. In another preferable embodiment, the processor 30 is constructed with the storage unit 40 to form a coprocessor, and the processor 30 loads pre-stored programs in the storage unit 40 and executes corresponding instructions and algorithms.

The display module 50 is used to display the instrumentation information to provide corresponding instrumentation data to users. Specifically, when the image analyzing device for instrumentation of the present invention is a hand-held device, the display module 50 is a screen of a hand-held device; when the image analyzing device for instrumentation is a monitor, the display module 50 is a screen of remote monitoring for the monitor, and the present invention is not limited thereto.

The remote server 60 connects to the processor 30 through the communication module 20 for managing the obtained instrumentation information. The obtained instrumentation information is integrated by the remote server 60 and is classified in accordance with the content of the instrumentation information. The obtained result is then stored in a server computer for data analyzing, monitoring, and maintaining by computers, operators, or equipment engineers.

The preferable embodiment of the present invention is illustrated as follows and is also referring to FIG. 1. The processor 30 executes and performs an algorithm in the storage unit 40 after loading it. The storage unit 40 mainly comprises an instrumentation identifying module M1 and an instrumentation information analyzing module M2.

The instrumentation identifying module M1 identifies the instrumentation image to generate an instrumentation information of the instrumentation. Specifically, the instrumentation identifying module M1 performs the following functions.

To identify instrumentation images, the instrumentation identifying module M1 conducts an image pretreatment process to the instrumentation image in advance, such as background removal, deskewing, noise removal, color to gray level transformation, and image binaryzation. Through the foregoing image pretreatment process, the obtained instrumentation image is easy to carry out image analysis. Performing of the image pretreatment process is not limited in any specific processes, for example, it may proceed image optimization first, and then capture the interesting zone to obtain the instrumentation information in the interesting zone. Similarly, it may obtain the interesting zone first, and then proceed with the image pretreatment process to perform the image optimization for further acquisition of a graphic, a character, and a figure of an instrumentation image.

The instrumentation identifying module M1 identifies the instrumentation category through the characteristic of the instrumentation image while obtaining the instrumentation image. Specifically, the instrumentation identifying module M1 constructs a database, compares the instrumentation image with an instrumentation image pre-stored in the database via image comparison method to match the instrumentation category with corresponding characteristic through the data stored in the database, and then identifies the instrumentation category. The image comparison method is, for example, K-nearest neighbor, voting, neural network algorithm, and Gauss algorithm and the present invention is not limited thereto. In another preferable embodiment, the instrumentation identifying module M1 identifies the instrumentation category with assistant objects such as QR code, bar code, and laser label, and the present invention is not limited thereto.

While obtaining the instrumentation image, the instrumentation identifying module M1 defines an interesting zone in the instrumentation image and performs a figure recognition process to a graphic, a character, and a figure within the interesting zone. Specifically, the instrumentation identifying module M1 can find the characteristic of the instrumentation image, such as zones combining together, zones having the same color, zones have the same gray level, the pattern of boundary zone, or other characteristic in the image, and analyze the possible position of the interesting zone. In a preferable embodiment, through providing an assistant graphic on the instrumentation in advance, the position of the interesting zone is quickly found with the assistant graphic. The assistant graphic is a printed, a painted, or an adhered marker, or a structural characteristic which is directly set on the instrumentation. The position of the interesting zone is quickly found within the instrumentation image by calculating the relative position. In an embodiment with a plurality of interesting zone, through detecting the relative positions of the interesting zones and analyzing the composing characteristic of the instrumentation, the parameter types represented by the displaying data within every interesting zone are identified by the composing characteristic. In another preferable embodiment, the parameters represented by the data within the interesting zone is determined by analyzing characters of one side of the interesting zone, such as an unit, so that the remote server 60 classifies the data in terms of types of the parameter according to the characters.

Except for the foregoing embodiment, in the embodiment that the present invention is applied to a hand-held device, the instrumentation identifying module M1 can find the position of the interesting zone quickly by generating a figure frame on a display module 50 and directly focusing the figure frame to the position of the interesting zone manually while shooting.

After obtaining the interesting zone, the instrumentation identifying module M1 performs a figure recognition process focusing on a graphic, a character, and a figure in the interesting zone to transform the represented a graphic, a character, and a figure in the instrumentation image as computer recognizable standard codes. The standard codes are any kind of computer readable alphabet encoding, such as ASCII, UNICODE, UTF-8, and the present invention is not limited thereto.

Specifically, the figure recognition process comprises two major methods to capture figures in the interesting zone; however, it must be explained first that the present invention is not limited in the following two methods.

Figure 2:
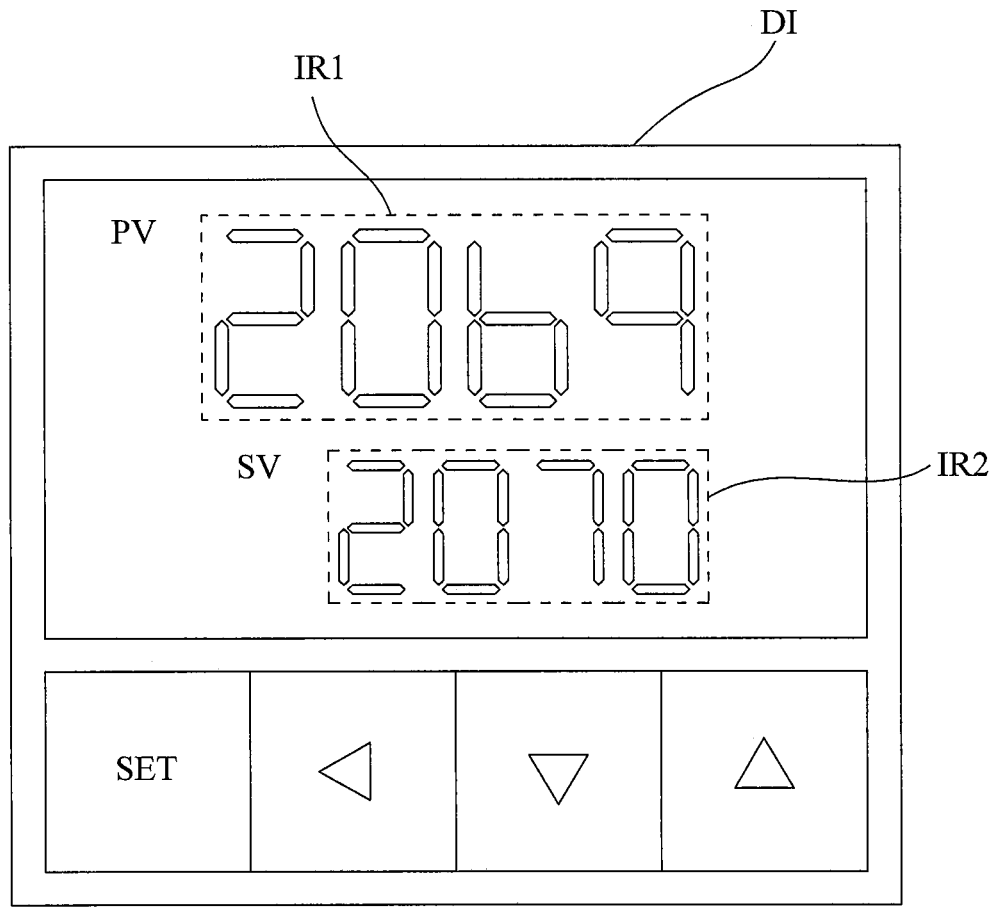
FIG. 2 shows a schematic diagram (a) of an example of the instrumentation image.

Also referring to FIG. 2, after dividing the zones, an interesting zone IR1 and an interesting zone IR2 of a digital instrumentation DI as the example embodiment are obtained. At this time, the instrumentation identifying module M1 captures characters nearby the interesting zone IR1 and interesting zone IR2 and determines the parameter's meaning represented by the interesting zone IR1 and the interesting zone IR2, respectively, through an optical character recognition (OCR) method. Through the example embodiment, it is known that the interesting zone IR1 is PV (presented value) in the instrumentation, and the interesting zone IR2 is SV (setting value) in the instrumentation, and it is classified in advance via the obtained analyzing result.

After classification, the instrumentation identifying module M1 detects the data in the interesting zones IR1 and IR2 to transform the data as standard codes. This procedure is conducted by splitting a character or figure image in the images of interesting zone IR1 and the interesting zone IR2 in accordance with an interval between each other through optical character recognition method, and retrieving characteristic from the character or figure image to match a data from a database and to obtain a standard code which represents the character or figure of the image. The obtained standard code is combined with a corresponding parameter category to form an instrumentation data information; and the instrumentation data information, instrumentation category information, and instrumentation indication information are combined as an instrumentation information so as to be transmitted to an external device easily.

Figure 3:
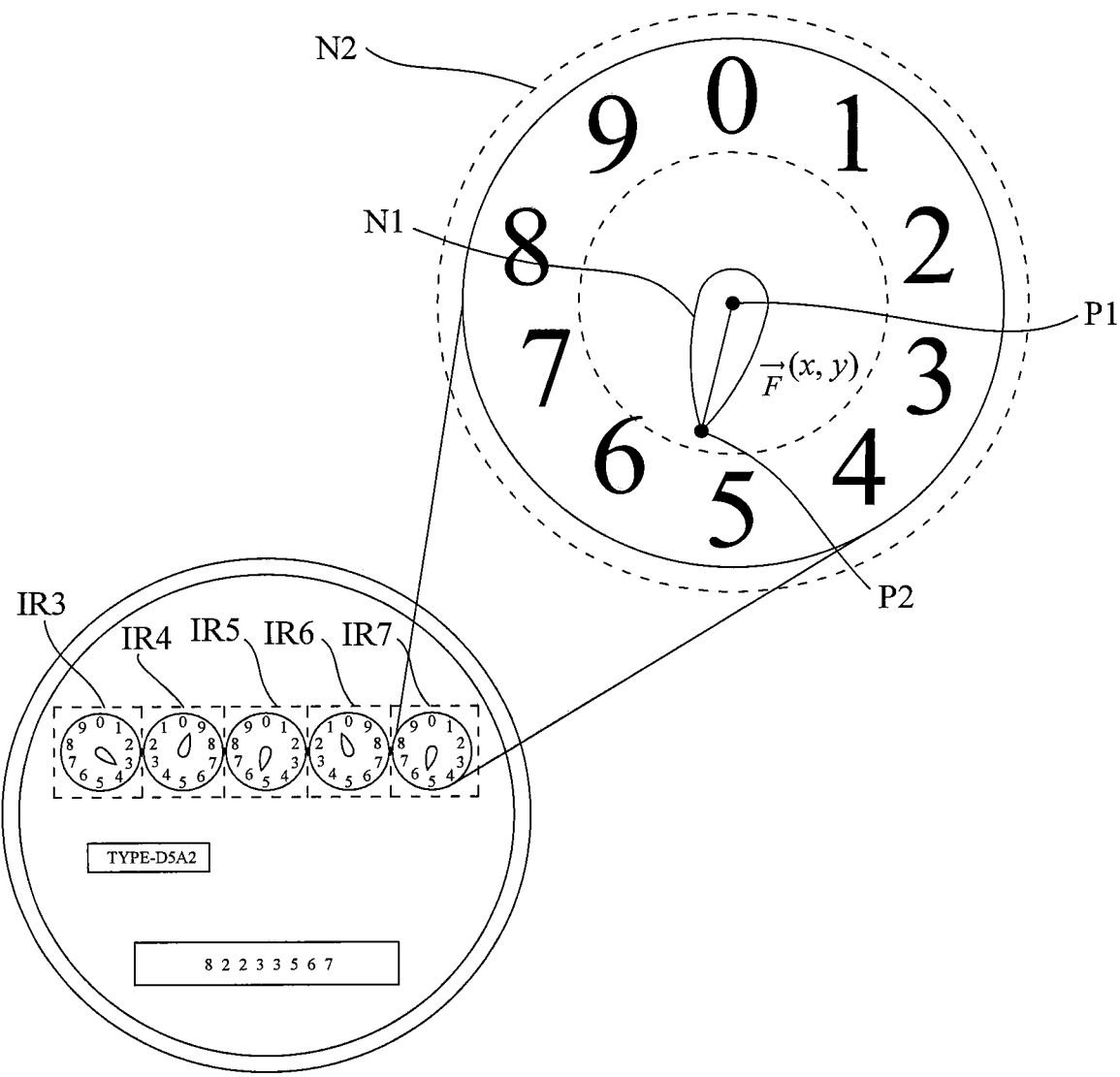
FIG. 3 shows a schematic diagram (b) of an example of the instrumentation image.

Another algorithm method is used to obtain data from the pointer-type instrumentation. Referring to FIG. 3, the detection of the pointer-type instrumentation is proceeded by figure classification and characteristic capturing in the interesting zone to obtain the data which represents the instrumentation image.

After dividing the zones, the interesting zones IR3-IR7 of the pointer-type instrumentation in the example embodiment are obtained. At this time, the model number is first captured so as to identify the instrumentation code by an optical character recognition (OCR) method to determine the type of the instrumentation; after determining the type of the instrumentation, the meaning of parameters corresponding to the composing positions of the interesting zones IR3-IR7 are determined by the type of instrumentation; the data of the interesting zone IR3-IR7 is combined with the corresponding parameter category to obtain an instrumentation data information.

Continuously, while proceeding figure recognition process, figure category is classified and then two objects, an indicating figure N1 and a scaling figure N2, are acquired from the interesting zone IR7 (only the interesting zone IR7 is illustrated in this drawing because other interesting zones in this example embodiment are same). Continuously, a digit code which corresponds to the scaling figure N2 pointed by the indicating figure N1 is obtained in accordance with the relative position between the indicating figure N1 and the scaling figure N2, and the digit code is outputted as an standard code. The relative position relationship is obtained by a vector $\vec{F}^{(x,y)}$ which is from the blunt end P1 to the sharp end P2 of the indicating figure N1; after obtaining the vector $\vec{F}^{(x,y)}$ a number which represents the scaling figure N2 is obtained by scaling intersection between the vector $\vec{F}^{(x,y)}$ and the scaling figure N2, and is outputted as a standard code for being transmitted to a remote server 50 to classify and store. While calculating the intersection between the vector and the scaling figure N2, preferably an angle normalization process is executed in advance to avoid the misjudgment by visual angle tilt.

After the foregoing figure recognition process is completed, a processor 30 arranges the obtained instrumentation data sequentially to obtain a standard code; in this example embodiment, the obtained instrumentation parameter is 39505. The obtained standard code and the corresponding parameter category is combined to form the instrumentation data information, and the instrumentation data information, instrumentation category information and instrumentation indication information are combined as an instrumentation information so as to be transmitted to an external device easily.

After being loaded with a program via the processor 30 or via an external device (such as a remote server 60), the instrumentation information analyzing module M2 executes the program, and the present invention is not limited thereto. The instrumentation information analyzing module M2 analyzes the instrumentation information of the at least one instrumentation after obtaining the instrumentation information to generate an instrumentation information evaluation result. Specifically, the instrumentation information evaluation result is a decision or datasheet outputting. In a preferable example embodiment, while acquiring many kinds of instrumentation information, the instrumentation information analyzing module M2 conducts decision calculating to each parameter data of the instrumentation information and decides whether to provide warnings or to adjust the operating way of corresponding machine and equipment, or to adjust environmental conditions according to the decision calculating results to achieve real-time controlling. In another preferable example embodiment, the instrumentation information analyzing module M2 manages the corresponding data and then outputs it as a personnel readable sheet so that operator reads the sheet content and accesses the machine, equipment, and environmental condition according to the sheet content.

Three different preferable example embodiments are illustrated as below; the image analyzing device for instrumentation of the present invention can apply to family, factory, and hospital to monitor the data of family instrumentation, industrial instrumentation, and hospital instrumentation.

Figure 4:
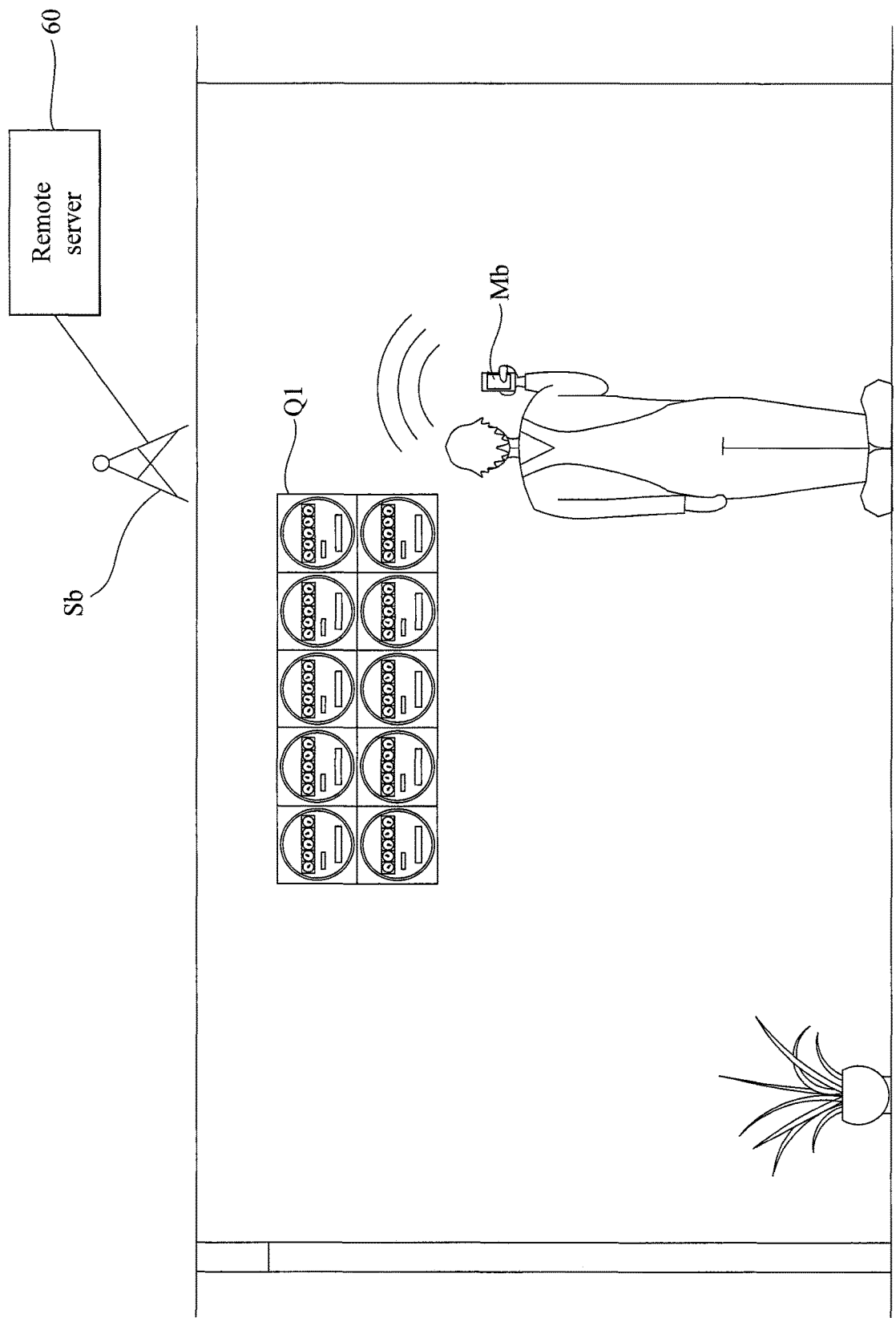
FIG. 4 shows a diagram (a) of one preferable embodiment of the instrumentation image analyzing system of the present invention.

In a preferable example embodiment, the image analyzing device for instrumentation 100 is applied to a hand-held device Mb, such as a mobile phone, a tablet, a PDA, a notebook, or other portable device. Referring to FIG. 4, when the present invention is applied to a hand-held device Mb, the meter reader installs the corresponding software into the hand-held device Mb and captures the instrumentation image of the instrumentation Q1 via the image capturing module 10 within the hand-held device Mb. After the processor 30 of the hand-held device executing computation, the obtained instrumentation information is uploaded to a remote server 60 by a base station Sb. Therefore, the remote server 60 can quickly record the data of the instrumentation Q1, and the convenience for the meter reader is enhanced and the possibility of misreading is avoid.

Figure 5:
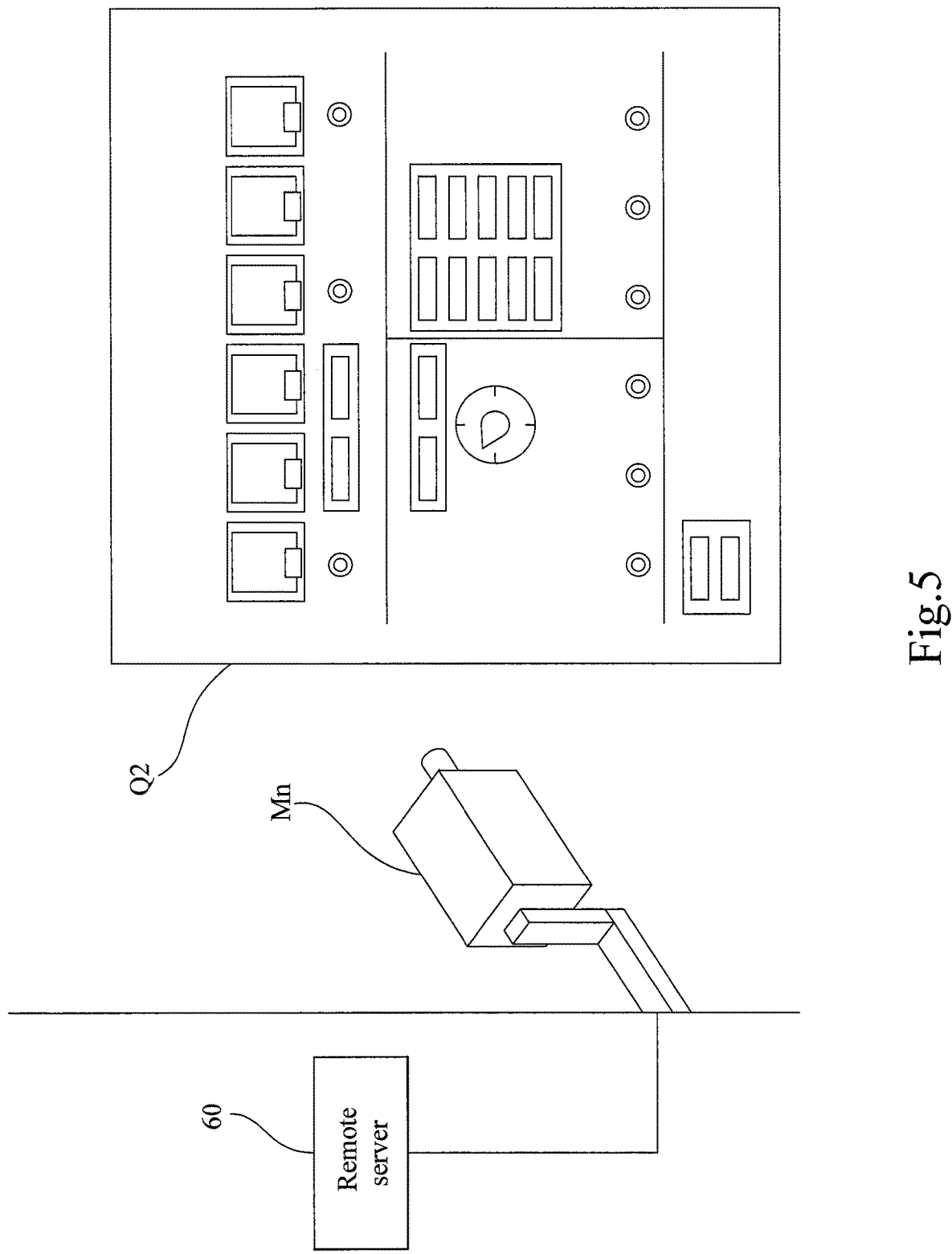
FIG. 5 shows a diagram (b) of one preferable embodiment of the instrumentation image analyzing system of the present invention.

In another preferable example embodiment, the image analyzing device for instrumentation 100 is applied to an outdoor monitor Mn via an existing monitor system to achieve the purpose of remote monitoring the instrumentation data. Referring to FIG. 5, the monitor Mn mainly comprises an image capturing module and a processor (not shown in FIG. 5) connected to the image capturing module. The image capturing module is to obtain the instrumentation image of the instrumentation Q2, and the processor obtains a standard code of the instrumentation data from the instrumentation image and transmits it to a remote server 60 to monitor. Through a high precision stationary monitor, simultaneous monitoring a plurality of instrumentations Q2 is possible and the cost for lots of wiring installation is avoided.

In another preferable example embodiment, the image capturing module attaches to the at least one instrumentation through a fixing device, wherein the fixing device includes a mechanical fixation device, a magnetic attraction device, or an adhesive material device.

Figure 6:
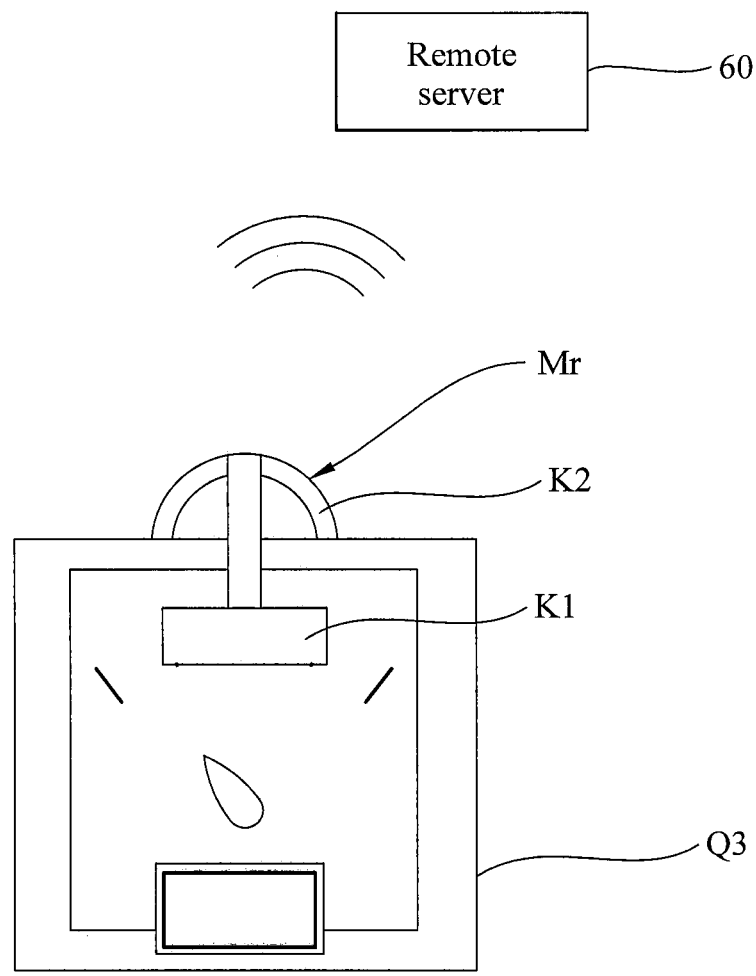
FIG. 6 shows a diagram (c) of one preferable embodiment of the instrumentation image analyzing system of the present invention.

The mechanical fixation device shows in FIG. 6: the image analyzing device for instrumentation 100 is implemented as a miniaturized instrumentation reading device Mr. The instrumentation reading device Mr comprises an image capturing module K1, a processor (not shown in FIG. 6) connected to the image capturing module K1, and a mechanical fixation mechanism K2. The mechanical fixation mechanism K2 combines to a instrumentation Q3 through mechanical combination techniques (such as clipping, buckle, screwing, embedding, or other mechanical combination techniques) to fix the image capturing module K1 to the at least one instrumentation Q3 for capturing the instrumentation image of the at least one instrumentation Q3, and then the instrumentation information is obtained from the captured instrumentation image and is uploaded to the remote server 60 through wire or wireless communication.

Figure 7:
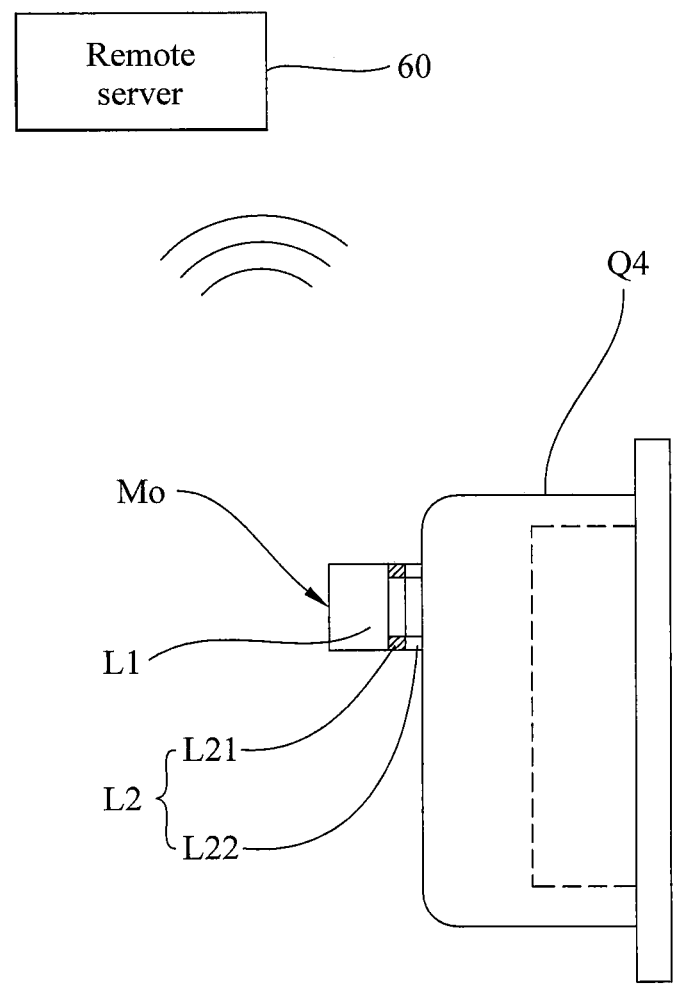
FIG. 7 shows a diagram (d) of one preferable embodiment of the instrumentation image analyzing system of the present invention.

The magnetic attraction device shows in FIG. 7: the image analyzing device for instrumentation 100 is implemented as a miniaturized instrumentation reading device Mo. The instrumentation reading device Mo comprises an image capturing module L1, a processor (not shown in FIG. 7) connected to the image capturing module L1, and a magnetic attraction mechanism L2. The magnetic attraction mechanism L2 comprises a first magnetic element L21 corresponding to the image capturing module L1 and a second magnetic element L22 corresponding to the attracted instrumentation Q4. The second magnetic element L22 is attached on the instrumentation Q4 for focusing the surroundings of the interesting zone of the instrumentation Q4. The first magnetic element L1 is coupled to the image capturing module L1, thereby the image capturing module L1 can be removed and replaced from the instrumentation Q4 easily. In another preferable example embodiment, if the instrumentation Q4 having magnetic property itself, the instrumentation reading device Mo is barely equipped with the first magnetic element L21 and is able to attach the instrumentation Q4, and the present invention is not limited thereto. The image capturing module L1 captures the image of the at least one instrumentation Q4 and obtains the instrumentation information via a processor, and uploads the instrumentation information to the remote server 60 through wire or wireless communication.

Figure 8:
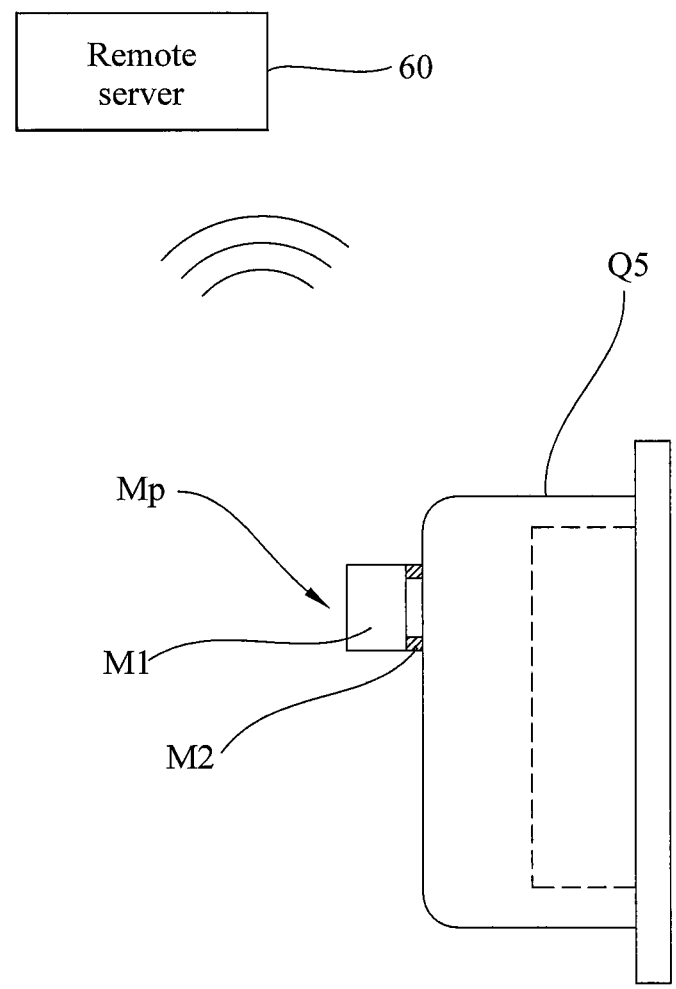
FIG. 8 shows a diagram (e) of one preferable embodiment of the instrumentation image analyzing system of the present invention.

The adhesive material device shows in FIG. 8: the image analyzing device for instrumentation 100 is implemented as a miniaturized instrumentation reading device Mp. The instrumentation reading device Mp comprises an image capturing module M1, a processor connected to the image capturing module M1 (not shown in FIG. 8), and an adhesive layer M2. The adhesive layer M2 is a specific adhesive material with repeating adhesive characteristic and having a certain level of adhesion. The image capturing module M1 attaches the surroundings of the interesting zone in the instrumentation Q5 via the adhesive layer M2. The image capturing module M1 captures the image of the at least one instrumentation Q5 and obtains the instrumentation information via a processor and uploads the instrumentation information to the remote server 60 through wire or wireless communication.

Figure 9:
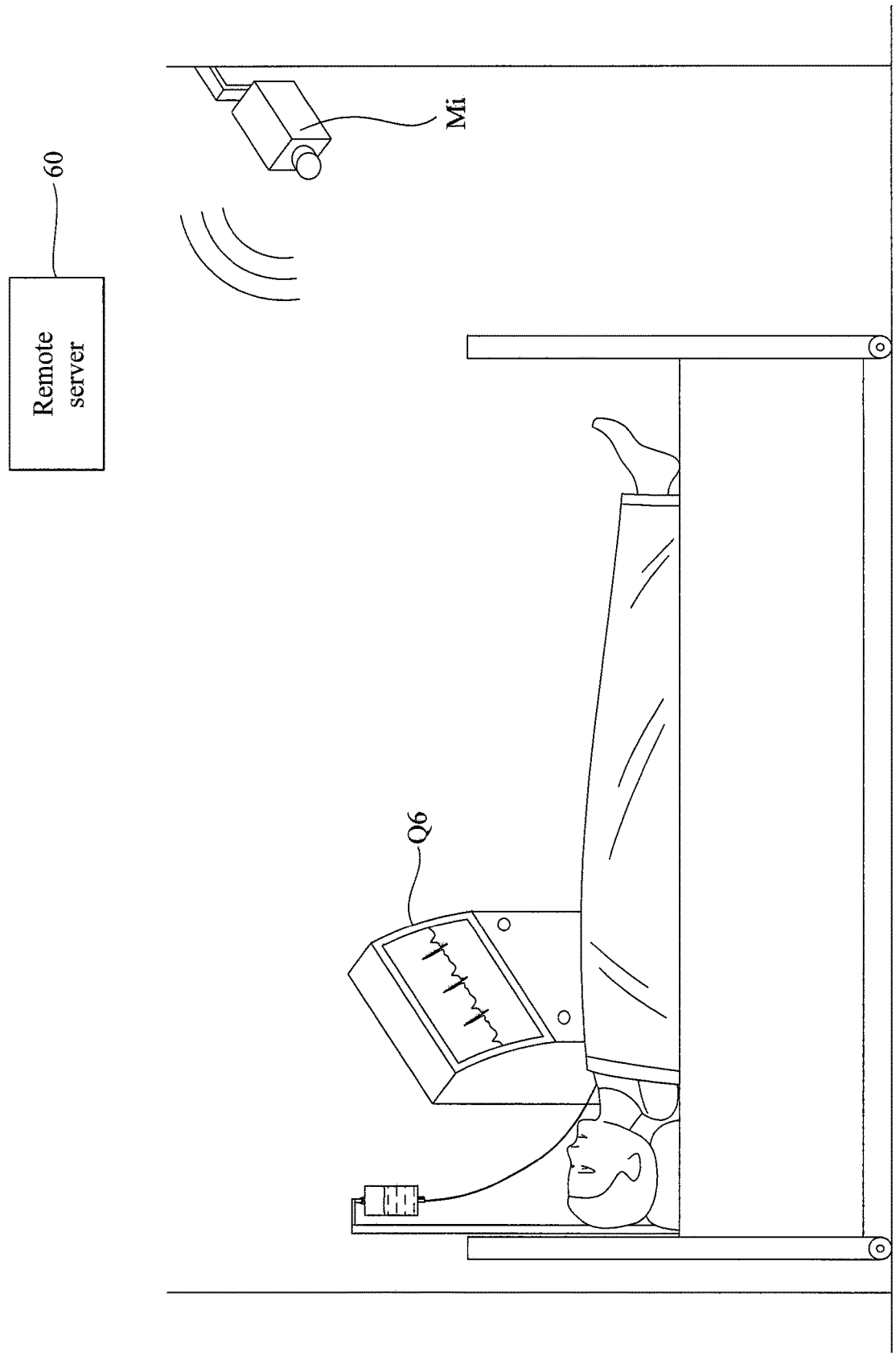
FIG. 9 shows a diagram (1) of one preferable embodiment of the instrumentation image analyzing system of the present invention.

In another example embodiment, the image analyzing device for instrumentation 100 is implemented as a monitor Mi installed in the hospital to monitor medical instruments for real-time monitoring patient's situation. As shown in FIG. 9, the monitor Mi mainly comprises an image capturing module and a processor (not shown in FIG. 9) connected to the image capturing module. The image capturing module obtains the image of the instrumentation Q6, and the processor obtains a standard code of the instrumentation data from the instrumentation image and transmits it to a remote server 60 to monitor. Through data monitoring, healthcare workers remotely monitor patient's situation, so as to reduce the frequency of entry wards and to enhance the convenience and friendliness of medical environment.

Figure 10:
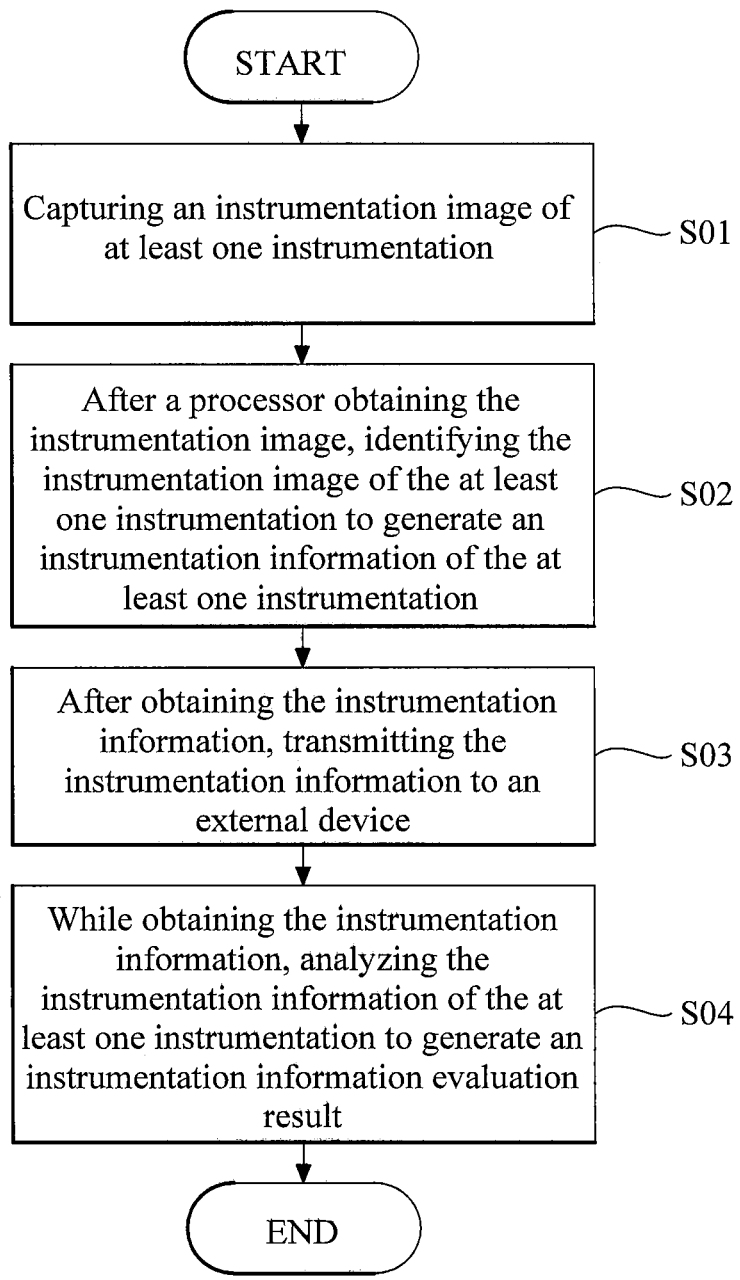
FIG. 10 shows a flow schematic diagram (a) of the image analyzing method for instrumentation of the present invention.

FIG. 10 shows a flowchart schematic diagram for the instrumentation data reading method of the present invention, and please also refers to the image analyzing device for instrumentation 100 as shown in FIG. 1.

At the initiation, the image capturing module 10 is activated to capture an instrumentation image of at least one instrumentation (Step S01). According to different example embodiments, the conditions for activating the image capturing module may be different. For example, while the image capturing module 10 is applied to a hand-held device, the module is activated by worker's hand manually. While the image capturing module 10 is applied to a monitor, the module is executed after activated by a monitor or an external device, and the present invention is not limited to the foregoing example embodiments.

The processor 30 identifies the image of the at least one instrumentation after obtaining the instrumentation image to generate the instrumentation information of the at least one instrumentation (Step S02). The instrumentation information comprises an instrumentation category information, an instrumentation data information, and/or an instrumentation indication information of the at least one instrumentation. In a preferable example embodiment, while obtaining the instrumentation information, the instrumentation information is displayed on a display module.

After obtaining the instrumentation information, the instrumentation information is transmitted to an external device (Step S03). The external device can be, such as, a backstage server for remote monitoring or recording the instrumentation information.

While obtaining the instrumentation information, the instrumentation information of the at least one instrumentation is analyzed to generate an instrumentation information evaluation result (Step S04). Step S04 can be executed by the native processor or an external device. While Step S04 is executed by the native processor, the obtained instrumentation information evaluation result and the instrumentation information are transmitted to the external device, so that the external device remotely monitors and records the instrumentation information.

Figure 11:
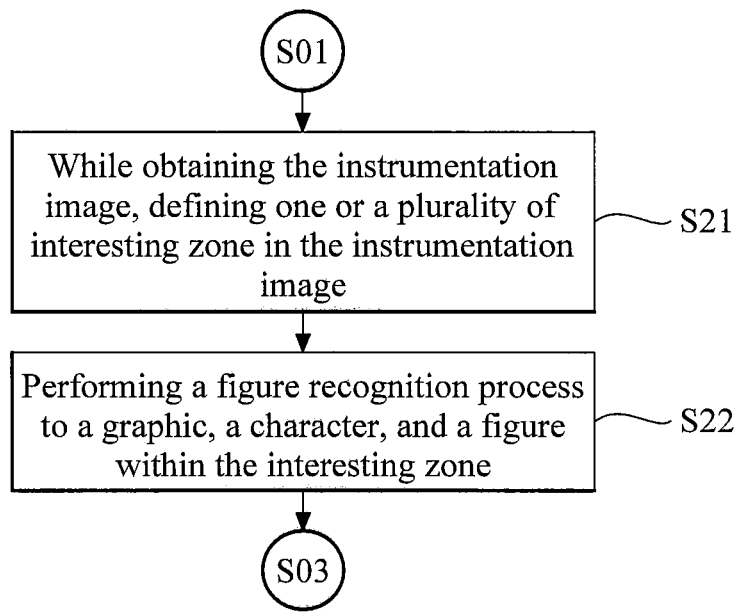
FIG. 11 shows a flow schematic diagram (b) of the image analyzing method for instrumentation of the present invention.

Among Step S02, the instrumentation identifying process is separated to the following two steps, referring to FIG. 11: defining one or a plurality of interesting zone in the instrumentation image while capturing the instrumentation image (Step S21); and performing a figure recognition process to a graphic, a character, and a figure within the interesting zone (Step S22).

The figure recognition process, in a preferable example embodiment, comprises the following algorithms: splitting a digit image in the interesting zone in accordance with an interval between each other; and retrieving characteristic from the digit image to match a data from a database and to obtain a standard code which represents the character or digit of the digit image.

The figure recognition process, in another preferable example embodiment, comprises the following algorithms: acquiring a scaling figure and an indicating figure from the interesting zone; and obtaining a digit code corresponding to the scaling figure pointed to the indicating figure in accordance with the relative position between the scaling figure and the indicating figure, and outputting the digit code as an standard code.

The steps in the method of the present invention are implemented as a computer programming product; the computer programming product with an internally-stored program is written by program languages to generate a computer programming. After loading the program into a computer, the program is executed and the foregoing embodiments of the method of the present invention are accomplished.

In another preferable example embodiment, the steps of the method of the present invention are implemented as a non-transitory computer readable record medium as well, which comprises a set of instructions for being executed by a computer and causing the computer to implement and accomplish the foregoing instrumentation data reading method. The non-transitory computer readable record medium can be, for example, a CD, a hard disk, and a semiconductor memory device, and the present invention is not limited thereto.

In conclusion, the present invention can be applied to various instrumentations to real-time control and monitor anomalous numerical value. Moreover, it may be implemented to read and control instrumentation data in various places such as hospital, house and so on. In another aspect, the present invention can record various instrumentation data through image analysis technique to effectively reduce not only costs but also mistakes caused by manual recording duties. Still in another aspect, the present invention simultaneously detects a plurality of instrumentations through image analysis to enhance the efficiency of reading instrumentations. The present invention is able to construct on an existing monitor system to obtain an instrumentation image and record an instrumentation data through the monitor system to reduce costs for setting up wiring lines.

The present invention is more detailed illustrated by the above preferable example embodiments. While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. An instrumentation image analyzing device, comprising:
    an image capturing module for capturing an image of at least one instrumentation to obtain an instrumentation image of the at least one instrumentation;
    a processor, which is connected to the image capturing module, for loading a program to perform an instrumentation identifying module which identifies the instrumentation image and generates an instrumentation information; and
    a communication module for transmitting the instrumentation information of the instrumentation to an external device;
    wherein the processor loads a program to perform an instrumentation information analyzing module which analyzes the instrumentation information of the at least one instrumentation to generate an instrumentation information evaluation result.

2. The instrumentation image analyzing device of claim 1, further comprising a display module for displaying the instrumentation information on the display module.

3. The instrumentation image analyzing device of claim 1, wherein the instrumentation information comprises an instrumentation category information, an instrumentation data information, and/or an instrumentation indication information of the at least one instrumentation.

4. The instrumentation image analyzing device of claim 1, wherein the image capturing module is fixed on the at least one instrumentation for capturing the image of the at least one instrumentation.

5. The instrumentation image analyzing device of claim 4, wherein the image capturing module attaches to the at least one instrumentation through a fixing device; wherein the form of the fixing device comprises mechanical fixation, magnetic attraction, and adhesive materials.

6. The instrumentation image analyzing device of claim 1, which is a hand-held device for the image capturing module to capture the image of the at least one instrumentation.

7. The instrumentation image analyzing device of claim 1, wherein the external device analyzes the instrumentation information of the instrumentation to generate an instrumentation information evaluation result.

8. The instrumentation image analyzing device of claim 1, wherein the instrumentation identifying module defines one or a plurality of interesting zone in the instrumentation image and performs a figure recognition process to a graphic, a character, and a figure within the interesting zone.

9. The instrumentation image analyzing device of claim 8, wherein the figure recognition process comprises:
   splitting a figure image in the interesting zone in accordance with an interval between each other; and
   retrieving characteristic from the figure image to match a data from a database and to obtain a standard code which represents the character or figure of the figure image.

10. The instrumentation image analyzing device of claim 8, wherein the figure recognition process comprises:
    acquiring a scaling figure and an indicating figure from the interesting zone; and
    obtaining a digit code corresponding to the scaling figure pointed to the indicating figure in accordance with the relative position between the scaling figure and the indicating figure and outputting the digit code as a standard code.

11. An instrumentation image analyzing system having the device as claimed in claim 1, comprising:
    a background server for receiving the instrumentation information and analyzing the instrumentation information of the instrumentation to generate an instrumentation information evaluation result.

12. An instrumentation image analyzing method, comprising:
    capturing an image of at least one instrumentation to obtain the instrumentation image of the at least one instrumentation through an image capturing module;
    identifying the instrumentation image to generate an instrumentation information of the instrumentation;
    transmitting the instrumentation information to an external device after generating the instrumentation information; and
    analyzing the instrumentation information of the at least one instrumentation to generate an instrumentation information evaluation result.

13. The method of claim 12, further comprising:
    displaying the instrumentation information on a display module.

14. The method of claim 12, wherein the instrumentation information comprises an instrumentation category information, an instrumentation data information, and/or an instrumentation indication information of the at least one instrumentation.

15. The method of claim 12, wherein the procedure of identifying the instrumentation image of the at least one instrumentation to generate the instrumentation information of the at least one instrumentation comprises:
    defining one or a plurality of interesting zone in the instrumentation image while capturing the instrumentation image; and
    performing a figure recognition process to a graphic, a character, and a figure within the interesting zone.

16. The method of claim 15, wherein the figure recognition process comprises:
    splitting the digit image in the interesting zone in accordance with an interval between each other; and
    retrieving characteristic from the digit image to match a data from a database and to obtain a standard code which represents the character or digit of the digit image.

17. The method of claim 15, wherein the figure recognition process comprises:
    acquiring a scaling figure and an indicating figure from the interesting zone; and
    obtaining a digit code corresponding to the scaling figure pointed to the indicating figure in accordance with the relative position between the scaling figure and the indicating figure and outputting the digit code as a standard code.

18. A non-transitory computer readable record medium, comprising a set of instructions for being executed on a computer and causing the computer to implement the method of claim 12 to complete the instrumentation image analyzing method.

* * * * *